July 21, 1925.
T. C. CRAWFORD
ROAD MAP
Filed Feb. 27, 1925
1,547,033
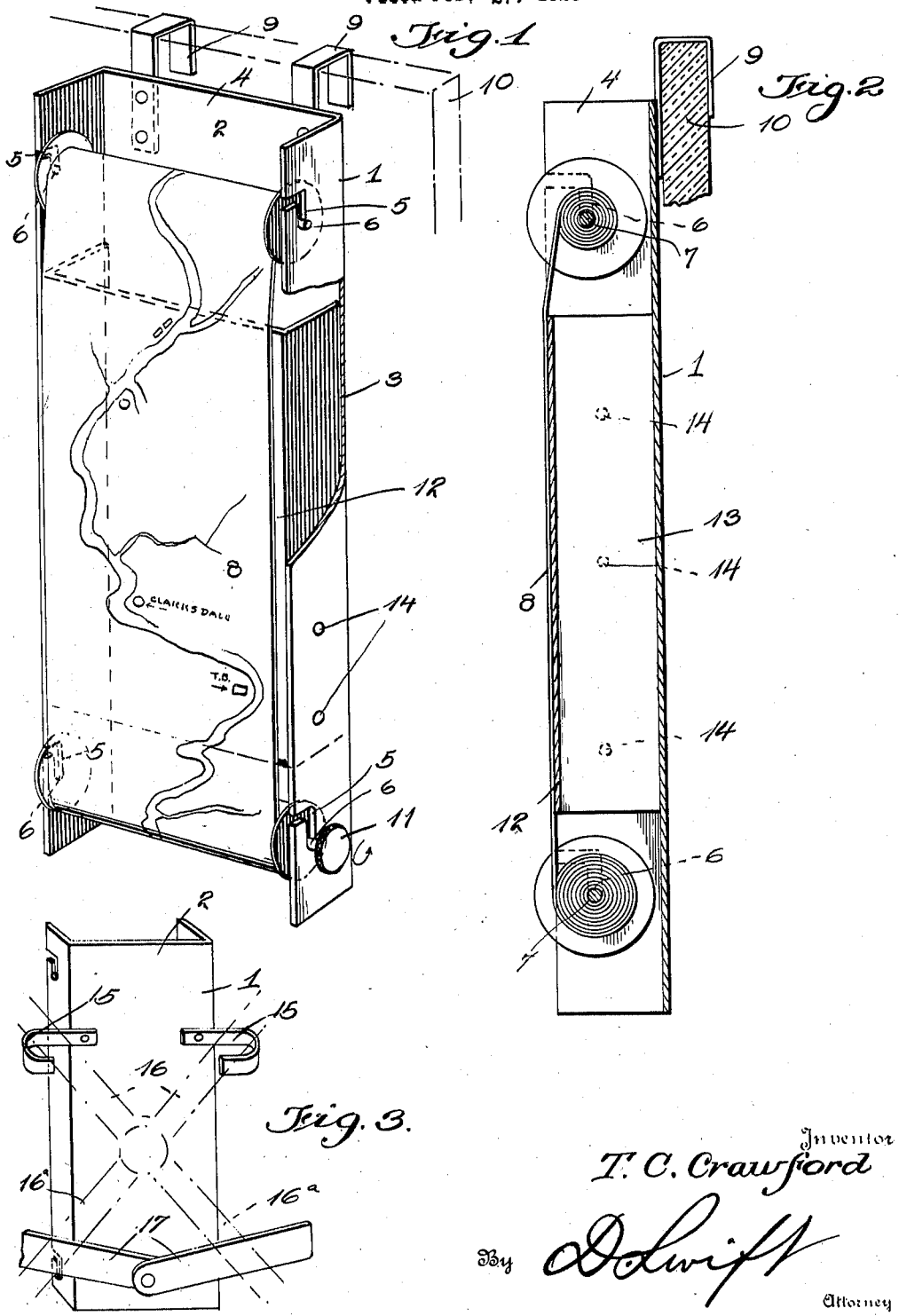
Inventor
T. C. Crawford
By D. Swift
Attorney Patented July 21, 1925.

1,547,033

UNITED STATES PATENT OFFICE.

THOMAS C. CRAWFORD, OF LULA, MISSISSIPPI.

ROAD MAP.

Application filed February 27, 1925. Serial No. 11,984.

*To all whom it may concern:*

Be it known that I, THOMAS C. CRAWFORD, a citizen of the United States, residing at Lula, in the county of Coahoma, State of Mississippi, have invented a new and useful Road Map; and I do hereby declare the following to be a full, clear, and exact description of the invention, such as will enable others skilled in the art to which it appertains to make and use the same.

The invention relates to road maps, particularly adapted for use by persons driving automobiles, and has for its object to provide a device of this character comprising a frame having supporting means thereon, and which frame is provided with removable spaced rollers onto and off of which an elongated flexible member having a map thereon may be rolled, thereby allowing the operator of the automobile to easily follow a road in any particular locality in which he may be touring. The removable rollers allow the map to be easily and quickly removed and replaced with a roller having thereon a contiguous map section, therefore it will be seen the operator may place in the device any desirable map section.

A further object is to form the frame from an elongated member U-shaped in transverse cross section and between the flanges thereof adjacent the ends of said flanges the map carrying rollers are disposed. Also to provide a bed plate between the flanges over which a portion of the map between the rollers passes, thereby not only maintaining the exposed portion of the map flat, but in a condition whereby the operator can easily make notes thereon with a pencil.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the map holder, showing the same supported on a windshield.

Figure 2 is a vertical transverse sectional view through the map holder.

Figure 3 is a perspective view of the map holder, showing a modified form of holding device whereby the map holder may be easily and quickly attached to the upper side of an automobile steering wheel.

Referring to the drawing, the numeral 1 designates the casing of the map holder, which casing is supported in a vertical position as shown in Figure 1 with its flat body portion 2 adjacent the windshield glass 3. The flanges 4 extend outwardly from the sides of the flat body portion 2 and are formed integral with the body portion, preferably from sheet metal which may be easily stamped to form. Flanges 4 adjacent their ends are provided with angularly shaped slots 5, which slots receive the pintles 6 of the rollers 7 disposed between the flanges, and on which rollers the ends of the map strips 8 are wound, and which map strip is provided with any kind of map desired showing a section of the country through which the tourist is traveling. It is to be understood that a tourist will have map sections of contiguous territory through which he contemplates traveling, and which map sections are preferably kept on rollers so that they may be easily and quickly placed in position within the holder, as needed. During the use of the device the map strip is fed from one roller to the other. The upper end of the body member 2 is provided with hooks 9 which hook over the upper rail 10 of the windshield, therefore it will be seen that the map is maintained in position where it can be easily reached by the hand of the operator for feeding the map strip from one roller to the other, at which time the operator grasps the finger engaging member 11 carried by the lower roller. Disposed within the holder between the flanges 4 thereof is a bed plate 12, which is provided with inwardly extending flanges 13, which may be secured by spot welding or otherwise to the flanges 4 of the casing, therefore it will be seen that the casing proper is formed from two members formed from sheet metal which may be easily stamped and assembled. The bed plate 12 not only maintains the map strip 8 flat as it is fed from one roller to another, but forms a hard backing for the map strip, thereby allowing the operator to easily make notes on the map strip as desired. If desired the feeding or rotating of the roller on which the map is being wound may be automatically accomplished from the speedometer, or in any other suitable manner.

Referring to Figure 3 wherein a modified form is shown, the casing is the same, however the rear side of the casing is provided with pivoted hooks 15 adapted to hook over the spokes 16 of a steering wheel, and with pivoted flexible arms adjacent its other end adapted to spring under the adjacent spokes 16ª of the steering wheel for positively and rigidly attaching the same to the upper side of the steering wheel in a position where it may be easily seen by the operator at all times during the steering operation.

From the above it will be seen that a road map container is provided which is simple in construction, the parts reduced to a minimum, thereby allowing the device to be cheaply manufactured and sold. It will also be seen that the device is formed from sheet metal members bent to form, which members when placed together form a rigid structure as well as a bed plate and casing.

The invention having been set forth what is claimed as new and useful is:—

The combination with a road map casing, a steering wheel, of means for attaching said casing to said steering wheel, said means comprising oppositely extending pivoted hooks carried by the casing and adapted to hook over adjacent spokes of the wheel, pivoted spring arms carried by the other end of the casing, said spring arms being adapted to hook under adjacent spokes of the wheel.

In testimony whereof I have signed my name to this specification in the presence of two subscribing witnesses.

THOMAS C. CRAWFORD.

Witnesses:
T. F. BURFORD,
T. R. COOPER.